(12) United States Patent
Dlugoss

(10) Patent No.: US 8,849,526 B2
(45) Date of Patent: Sep. 30, 2014

(54) ADAPTIVE SPEED-BASED CONTROL OF A BINARY CLUTCH ASSEMBLY

(71) Applicant: GM Global Technology Operations LLC, Detroit, MI (US)

(72) Inventor: Randall B. Dlugoss, Royal Oak, MI (US)

(73) Assignee: GM Global Technology Operations LLC, Detroit, MI (US)

(*) Notice: Subject to any disclaimer, the term of this patent is extended or adjusted under 35 U.S.C. 154(b) by 67 days.

(21) Appl. No.: 13/664,476

(22) Filed: Oct. 31, 2012

(65) Prior Publication Data
US 2014/0121916 A1 May 1, 2014

(51) Int. Cl.
*G06F 7/00* (2006.01)
(52) U.S. Cl.
USPC ............................................................ 701/54
(58) Field of Classification Search
USPC ..................... 701/51, 54, 67, 70, 71, 74, 82
See application file for complete search history.

(56) References Cited

U.S. PATENT DOCUMENTS

| | | | |
|---|---|---|---|
| 6,478,713 B1 * | 11/2002 | Runde et al. .................. | 477/107 |
| 2002/0025881 A1 * | 2/2002 | Miyazaki et al. ............... | 477/44 |

* cited by examiner

*Primary Examiner* — Kim T Nguyen
(74) *Attorney, Agent, or Firm* — Quinn Law Group, PLLC

(57) ABSTRACT

A vehicle includes an engine and a transmission, the latter of which includes a controller which executes an adaptive speed-based control method. The transmission includes gear sets each having multiple nodes, an input member continuously connected to the engine and to one of the gear sets, and a binary clutch assembly connected to the same gear set as the input member. The controller is programmed to detect a requested transmission shift into an engine braking state while the vehicle is coasting. The controller also commands an increase in engine speed to a target engine speed in response to the requested shift, and applied the binary clutch assembly when the engine output speed reaches the target engine speed. The controller calculates slip across the binary clutch assembly and adjusts the target engine speed as needed over time until the target slip is achieved at the target engine speed.

20 Claims, 2 Drawing Sheets

ADAPTIVE SPEED-BASED CONTROL OF A BINARY CLUTCH ASSEMBLY

TECHNICAL FIELD

The disclosure relates to adaptive speed-based control of a binary clutch assembly.

BACKGROUND

A motor vehicle transmission typically uses interconnected gear elements and clutches to couple rotatable transmission input and output members, and to thereby establish a desired transmission speed ratio. Clutches may be configured as fluid-actuated devices having a series of spaced friction plates. A hydraulic piston is actuated so as to compress the friction plates together and thereby transfer torque across the engaged clutch, or to stop rotation of a side of the clutch and any interconnected gear elements or nodes. Plate clutches are typically controlled with a variable rate of slip, such that the state of the clutch can range from fully-applied to fully-released and anywhere in between.

In some transmissions, a binary clutch assembly having, e.g., a selectable one-way clutch, a freewheeling element, or a dog clutch, is used alone or in conjunction with the rotating and/or braking plate clutches noted above to establish one or more gear states. Unlike conventional plate clutches, a binary clutch assembly, as the name indicates, has just two possible states: fully-applied and fully-released. When fully-applied, the binary clutch assembly is prevented from rotating in both rotational directions. When in the fully-released state, the binary clutch assembly freewheels in one rotational direction, and thus one side of the binary clutch effectively slips with respect to the other side.

SUMMARY

A vehicle is disclosed herein that includes a transmission with a binary clutch assembly. The transmission receives input torque from an engine or another prime mover, and includes one or more gear sets, at least one node of which is connected to the binary clutch assembly. The binary clutch assembly may be any torque transfer device having the two states noted above: fully-applied and fully-released, i.e., any device characterized by an absence of any partially-engaged states. A controller of the transmission is in communication with the binary clutch assembly and with the engine. The controller automatically detects a requested shift of the transmission into an engine braking state while the vehicle is coasting, for instance a shift from $2^{nd}$ gear to $1^{st}$ gear low.

In response to the requested engine braking shift, the controller selectively reduces the amount of slip occurring across the binary clutch assembly to a target slip level. This control action includes ramping actual engine speed toward a calibrated target engine speed. Actual engine speed is actively controlled until a calculated slip across the binary clutch assembly reaches the target slip level, which is in all embodiments zero or approximately zero. As used herein, the term "approximately zero" can encompass any slip value within a permissible small range of zero, e.g., 0±5 RPM or 0±10 RPM depending on the embodiment.

At such a low slip level, the binary clutch assembly may be applied without undue noise, vibration, or harshness, and without damaging struts or other torque holding elements of the binary clutch assembly. The controller thereafter releases the active engine speed control, commands the application of the binary clutch assembly, and ultimately shifts the transmission into the requested engine braking state. An engine control module or other control module may resume normal engine control as needed after entering the engine braking state according to existing engine and transmission control algorithms lying outside the scope of the present invention.

Central to the present control approach is adaptive speed control. The controller automatically applies the binary clutch assembly based on calculated level of slip across the binary clutch assembly. However, if the calculated slip is low/zero for an extended time before the target engine speed is reached, this could mean that active engine speed control has been maintained for too long, and/or that the target engine speed is too high. As a result, the controller may automatically adapt/adjust the target engine speed, in this example lowering the target engine speed. The adjusted target engine speed is then recorded in memory of the controller, and the entire process is repeated at the onset of a subsequent requested engine braking shift.

In particular, a vehicle is disclosed herein that includes an internal combustion engine and a transmission. The transmission has multiple gear sets each having a plurality of nodes. The transmission also includes an input member, a binary clutch assembly, and a controller. The input member is continuously connected to the engine and to one of the gear sets. The binary clutch assembly may be connected to the same gear set as the input member. The controller detects a requested shift of the transmission into an engine braking state while the vehicle is coasting, and commands, via a processor, an increase in output speed of the engine toward a calibrated target engine speed in response to the detected requested shift.

The controller may also monitor the level of slip across the binary clutch assembly while actively controlling the output speed toward the target engine speed. The controller commands apply of the binary clutch assembly when the engine output speed reaches the target speed, or when the slip reaches its slip target. The controller then shifts the transmission into the engine braking state after applying the binary clutch assembly. The controller periodically adjusts the target engine speed by a calibrated amount over time until the target slip is achieved at the target engine speed.

A method includes detecting in a vehicle, via a controller, a requested shift of a transmission to an engine braking state while the vehicle is coasting. The method includes ramping an output speed of the engine toward a calibrated target engine speed in response to the requested shift, and then monitoring the level of slip across the binary clutch assembly. The binary clutch assembly is applied when the output speed of the engine reaches the target speed or when the level of slip reaches a target slip, whichever comes first. The target engine speed is then adjusted by a calibrated amount, upward or downward, as needed.

A transmission is also disclosed herein for a vehicle having an engine. The transmission has first, second, and third gear sets, with each gear set having multiple nodes. The transmission also includes an input member that is selectively connected to the first gear set and continuously connected to the second gear set. The input member receives input torque from the engine. A binary clutch assembly and a controller are also included in the transmission. The binary clutch assembly is connected to the first and second gear sets. The controller, which is in communication with the engine and with the binary clutch, executes instructions from memory to thereby execute the steps noted above. Slip across the binary clutch assembly is thus largely or fully eliminated before its application, thereby minimizing shock the binary clutch assembly and any noise, vibration, and harshness resulting from such an application.

The above features and the advantages of the present disclosure are readily apparent from the following detailed description of the best modes for carrying out the invention when taken in connection with the accompanying drawings.

DETAILED DESCRIPTION

Figure 1:
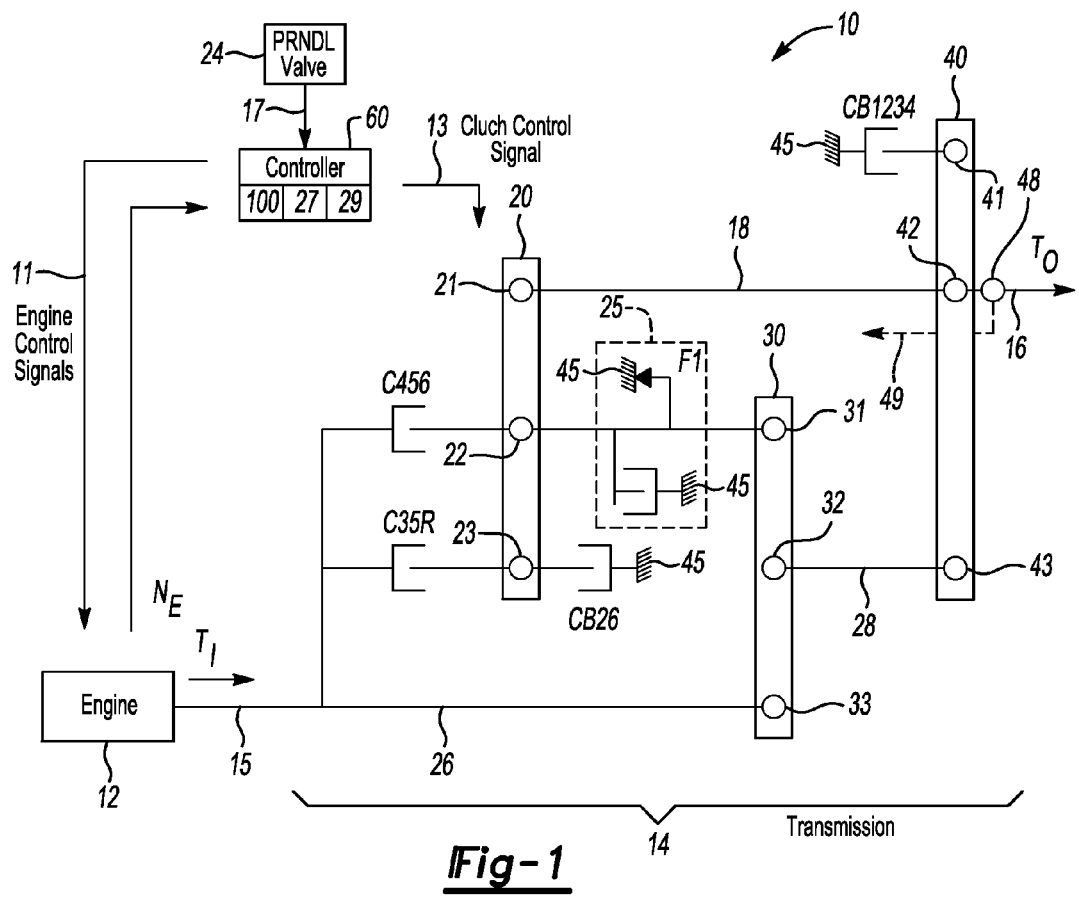
FIG. 1 is a schematic illustration of an example vehicle having an automatic transmission with a binary clutch assembly, the slip across which is controlled in response to a requested shift into an engine braking state while the vehicle is coasting.

Referring to the drawings, an example vehicle 10 is shown schematically in FIG. 1 having an internal combustion engine 12 or other prime mover and an automatic transmission 14. The transmission 14 is shown as a schematic lever diagram, as will be understood by those having ordinary skill in the art. At least one node of the transmission 14 is connected to a binary clutch assembly 25, e.g., a selectable one-way clutch, a freewheeling element such as element F1, a dog clutch, or any other clutch device having only the binary states of fully-applied/engaged and fully-released as noted above.

A controller 60 is in communication with the binary clutch assembly 25 and with the engine 12. The controller 60 is configured to detect a requested shift of the transmission 14 into an engine braking state while the vehicle 10 is coasting. Such a shift requires the application of the binary clutch assembly 25, such as in a shift from $2^{nd}$ gear to $1^{st}$ gear low. However, the binary clutch assembly 25 cannot always be applied immediately upon request. For instance, slip across the binary clutch assembly 25 may be too high at the moment engine braking is requested, such that an immediate application of the binary clutch assembly 25 could damage torque holding elements of the binary clutch assembly 25 and/or render the shift event unacceptably harsh. The controller 60 handles this particular control problem via execution of instructions embodying the method 100, an example of which is described below with reference to FIGS. 2 and 3.

The example transmission 14 of FIG. 1 may include an input member 15 and output member 16. The respective input and output members 15 and 16 are selectively connected to each other at a desired speed ration via a plurality of gear sets. In the example embodiment of FIG. 1, the transmission 14 is a 6-speed automatic transmission having three planetary gear sets, i.e., a first gear set 20, a second gear set 30, and a third gear set 40. However, other configurations may be used without departing from the intended inventive scope. Input torque (arrow $T_I$) from the engine 12 or another prime mover, such as an electric traction motor, is transferred through the transmission 14 such that output torque (arrow $T_O$) is ultimately transferred to the output member 16, and thereafter to the drive axles and drive wheels (not shown).

The first gear set 20 of FIG. 1 may include first, second, and third nodes 21, 22, and 23, respectively. The second and third gear sets 30 and 40 may likewise have respective first, second, and third nodes. For the second gear set 30, the first, second, and third nodes are nodes 31, 32, and 33, respectively. The third gear set 30 includes respective first, second, and third nodes 41, 42, and 43.

With respect to the first gear set 20, the first node 21 is continuously connected to the second node 42 of the third gear set 40 via an interconnecting member 18. The second node 22 is selectively connected to the engine 12 and the input member 15 via a first rotating clutch C456. Likewise, the third node 23 is selectively connected to the engine 12 and the input member 15 via a second rotating clutch C35R. The third node 23 is selectively connected to a stationary member 45 of the transmission via a first braking clutch CB26. As used herein for all clutches, the letter "C" refers to "clutch", "B" refers to "brake", and the various numbers refer to the particular forward drive gear modes, e.g., "R" is reverse, "1" is $1^{st}$ gear, "2" represents $2^{nd}$ gear, etc., all the way up to $6^{th}$ gear. The absence of a "B" in the clutch designation indicates that the particular clutch is a rotating clutch.

In the second gear set 30 of FIG. 1, the first node 31 is selectively connected to the second node 22 of the first gear set 20 via the binary clutch assembly 25. Engagement of the binary clutch assembly 25 locks the nodes 22 and 31 to a stationary member 45 of the transmission 14. The second node 32 is continuously connected to the third node 43 of the third gear set 40 via another interconnecting member 28. The third node 33 is continuously connected to the input member 15 directly or via another interconnecting member 26. The first node 41 of the third gear set 40 is selectively connected to the stationary member 45 via a second braking clutch CB1234. An optional transmission output speed sensor 48 may be positioned with respect to the output member 16, with the measured output speed relayed as an additional control signal (arrow 49) to the controller 60.

The controller 60 shown schematically in FIG. 1 may be embodied as a digital computer device or multiple such devices in communication with the engine 12 and with a PRNDL (park, reverse, neutral, drive, low) valve 24. The controller 60 thus receives, either directly or via an engine control module (not shown), and engine speed (arrow $N_E$) and a PRNDL setting (arrow 17). The controller 60 selectively transmits an engine control signals (arrow 11) requesting a target engine speed as explained below with reference to FIGS. 2 and 3, e.g., in response to movement of the PRNDL valve 24 into $1^{st}$ gear low (L), to enter an engine braking state, or otherwise detects such a requested shift. After transmitting the engine control signal (arrow 11), the controller 60 waits until the slip across the binary clutch assembly 25 reaches the threshold slip before applying the binary clutch assembly 25.

It is recognized herein that the binary clutch assembly 25 may not come on at precisely the desired moment due to production variation in the vehicle 10. That is, each engine 12 may have some level of variation, however slight, that could lead to variation in actual engine speed (arrow $N_E$) in response to received engine control signals (arrow 11). Variation may exist not only in the engine speed, but also in the manner in which certain parameters in the control of the engine 12 or the transmission 14 are measured and controlled, including fluid pressure variations, transmission input and/or output speed variations, etc.

Therefore, the controller 60 is configured to periodically adjust or adapt the target engine speed over time to account for such variation, and to thus fine tune the moment in time at which the binary clutch assembly 25 is applied in conjunction with an engine braking shift. A possible approach for achieving this control objective is described below with reference to FIG. 3.

Structurally, the controller 60 may include at least one processor 27 along with tangible, non-transitory memory 29, e.g., read-only memory (ROM), flash memory, optical memory, additional magnetic memory, etc. The controller 60 may also include random access memory (RAM), electrically programmable read only memory (EPROM), a high-speed clock, analog-to-digital (A/D) and/or digital-to-analog (D/A) circuitry, and any input/output circuitry or devices, as well as any appropriate signal conditioning and buffer circuitry. Instructions for executing the method 100 for controlling slip across the binary clutch assembly 25 are recorded in the memory 29 and executed via the processor(s) 27.

Figure 2:
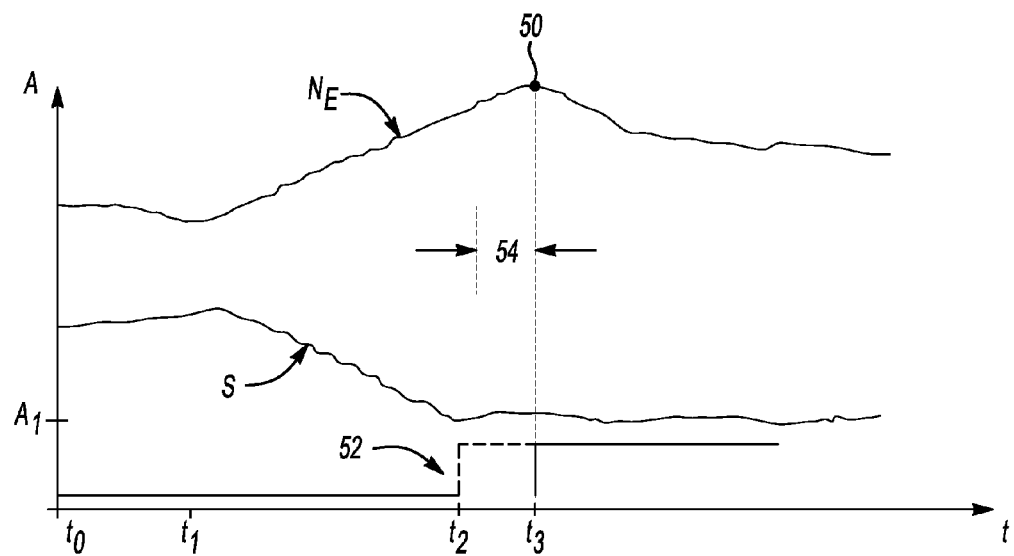
FIG. 2 is a set of traces describing vehicle parameters controlled in the execution of the present method.

Referring to FIG. 2 in conjunction with the structure of FIG. 1, actual engine speed ($N_E$) is shown along with a level of slip (S) across the binary clutch assembly 25. Amplitude (A) is plotted on the vertical axis, while time (t) is plotted on the horizontal axis. From $t_0$ to about $t_1$, engine speed ($N_E$) is not actively controlled by the controller 60, and the binary clutch assembly 25 remains released/disengaged. The vehicle 10 of FIG. 1 freely coasts in a drive state such as $2^{nd}$ gear or higher.

The driver of the vehicle 10 may decide at this time that engine braking is desirable. To achieve an engine braking state, the driver may shift a PRNDL lever (not shown) into first gear low (L), which occurs in FIG. 2 at about $t_1$. At the same moment, having detected the requested engine braking shift, the controller 60 begins to ramp up engine speed ($N_E$) toward a calibrated target engine speed (point 50).

As engine speed ($N_E$) rises, the level of slip (S) across the binary clutch assembly 25 of FIG. 1 begins to fall. This occurs largely because the transmission 14 is configured such that any connected node(s), i.e., any nodes directly connected to the binary clutch assembly 25, which in the example of FIG. 1 includes nodes 22 and 31, can be controlled by changing the input speed from the engine 12. Any transmission designs having this particular characteristic could be similarly controlled without departing from the intended inventive scope.

When the level of slip (S) across the binary clutch assembly 25 passes below a target slip level ($A_1$), e.g., zero or within a calibrated range thereof, such as 0±5 RPM or 0±10 RPM, the controller 60 transmits the clutch control signal (arrow 13 of FIG. 1) to the binary clutch assembly 25, thus applying the binary clutch assembly 25. This occurs at about $t_3$ of FIG. 2 as indicated by trace 52, with trace 52 representing the commanded on/applied state of the binary clutch assembly 25. A goal of the present approach is to ensure, over time, that the target engine speed used by the controller 60 coincides with a target zero or low non-zero slip across the binary clutch assembly 25. Therefore, the controller 60 periodically adapts or adjusts the target engine speed as needed so that the target engine speed eventually coincides with the target slip.

By way of illustration, a time gap 54 may exist between the moment slip across the binary clutch assembly 25 actually reaches its target slip, i.e., at about $t_2$ in FIG. 2, and the moment at which engine speed ($N_E$) reaches the target engine speed (point 50). Another possible result not shown in FIG. 2 is that the level of slip (S) does not reach the target slip level ($A_1$) before engine speed ($N_E$) reaches the target engine speed (point 50). Thus, the controller 60 is configured to solve both possible problems by automatically adapting the target engine speed (point 50) as needed to minimize and ultimately eliminate the time gap 54. That is, over time the target engine speed (point 50) should occur at the same moment that slip (S) across the binary clutch assembly 25 reaches its target slip.

Figure 3:
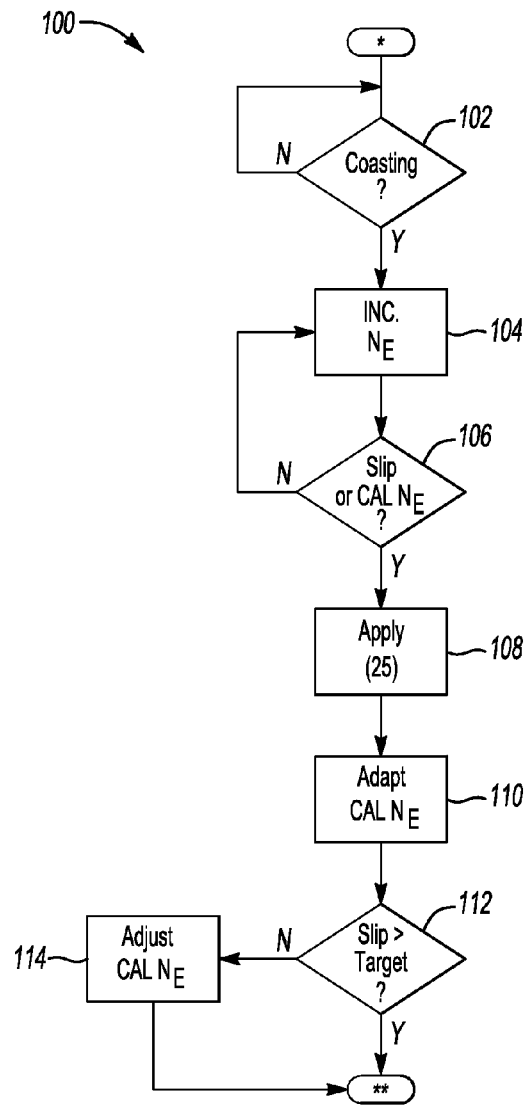
FIG. 3 is a flow chart describing an example method for adaptive control of the binary clutch assembly prior to a shift into an engine braking state.

Referring to FIG. 3 in conjunction with the structure shown in FIG. 1, an example embodiment is depicted for the method 100. Upon initialization (*), the method 100 executes step 102. As part of step 102, the controller 60 may determine whether the vehicle 10 is coasting, and also that the driver has requested a shift into an engine braking state. Coasting may be detected in any suitable manner, including by measuring the transmission output speed, e.g., via the transmission output speed sensor 48. The requested engine braking shift may be detected via measurement of the PRNDL valve setting (arrow 17) or by receipt or measurement of any other suitable signal. The controller 60 repeats step 102 in a loop until these two conditions are detected, and then proceeds to step 104.

At step 104, the controller 60 next commands an increase in actual engine speed ($N_E$) via the engine control signals (arrow 11). As a result, engine speed ($N_E$) begins to ramp toward the calibrated target engine speed, which is represented by point 50 in FIG. 2. The method 100 process to step 106 as engine speed ($N_E$) is still increasing.

At step 106, the controller 60 calculates or otherwise monitors the level of slip across the binary clutch assembly 25 and the changing engine speed ($N_E$). Step 106 entails determining whether either of the target slip or the calibrated target engine speed has been reached. Steps 104 and 106 are repeated in a loop until engine speed ($N_E$) reaches the target engine speed, and/or until the calculated slip across the binary clutch assembly 25 reaches the target slip, at which point the active engine speed control from step 104 is discontinued. The method 100 proceeds to step 108.

The binary clutch assembly 25 is applied at step 108. The controller 60 may transmit the clutch control signals (arrow 13) to any associated actuators of the binary clutch assembly 25 to command application. The controller 60 may thereafter shift the transmission 14 into the engine braking state that was previously requested at step 102 before proceeding to step 110.

At step 110, the controller 60 determines whether to adapt the target engine speed. Step 110 may include calculating the engine speed ($N_E$) at the moment at which the level of slip occurring across the binary clutch assembly 25 allows the binary clutch assembly 25 to be safely applied. Step 110 may entail determining how long slip was at or near its target slip before reaching the target engine speed, e.g., via a timer, which may indicate that active engine control was held for longer than necessary.

The controller 60 may calculate any excess engine speed ($N_E$) present at that moment. For example, if a target engine speed of $N_T$ is set, and zero slip is reached before this target engine speed is reached, the engine speed at zero slip, for instance $N_{T-1}$, may be recorded. The controller 60 may then determine how much adjustment is required to the target engine speed, in this instance by gradually lowering the target engine speed from $N_T$ to $N_{T-1}$.

As will be well understood by those of ordinary skill in the art, in a multi-gearset transmission such as the example transmission 14 of FIG. 1, knowledge of the speed of any three nodes of the transmission 14 allows the controller 60 to determine the speed of any other node. For example, knowledge of the engine speed ($N_E$) allows the controller 60 to determine the rotational speed of node 33, while $2^{nd}$ gear requires engagement of the braking clutches CB1234 and CB26, and thus zero speed at the affected nodes. Nodes 21 and 42 rotate at the output speed of the transmission 14, a value which can be measured via the output speed sensor 48 of FIG. 1. The slip across the binary clutch assembly 25 may be calculated via the controller 60 using the calculated speeds of nodes 22 and 31, particularly if engine braking is entered while traveling in $2^{nd}$ gear. The method 100 proceeds to step 112 once the engine speed ($N_E$) is known at the moment at which slip across the binary clutch assembly 25 reaches its target slip level.

At step 112, when the target engine speed is reached prior to reaching the target slip, the controller 60 may determine the level of slip occurring at the target engine speed. If the slip is still too high relative to the target slip, the method 100 proceeds to step 114. Otherwise, the method 100 is complete (**), with the target slip and the target engine speed sufficiently coinciding.

Step 114 may include adjusting the target engine speed upward or downward, and then recording the new target engine speed in memory 22. Steps 110 and 112 inform the action taken at step 114. For instance, if at step 110 it is determined that there is excess engine speed, this means that the target engine speed is too high. The controller 60 can adjust the target engine speed downward. However, if at step 112 the calculations show that target slip is not reached before the target engine speed is attained, the control action at step 114 may include adjusting the target engine speed upward. The method 100 starts anew with a subsequent engine braking event using the newly recorded target speed.

In the adaptive speed control of the binary clutch assembly 25, it may be beneficial to limit each speed adjustment to the small calibrated amount, e.g., 1 or 2 RPM, or less than 5 RPM in another embodiment. Doing so may help to minimize the chance of significantly overshooting an ideal target engine speed or an ideal slip speed for the binary clutch assembly 25.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an internal combustion engine; and
a transmission having:
   a plurality of gear sets each having a plurality of nodes;
   an input member that is continuously connected to the engine and to one of the gear sets;
   a binary clutch assembly that is connected to the same gear set as the input member; and
   a controller in communication with the engine and with the binary clutch, wherein the controller includes a processor and memory with a recorded target slip, and wherein the controller is operable to:
      detect a requested shift of the transmission into an engine braking state while the vehicle is coasting;
      command, via the processor, an increase in engine speed toward a target engine speed in response to the detected requested shift;
      calculate a level of slip across the binary clutch assembly while increasing the engine speed toward the target engine speed;
      command an application of the binary clutch assembly when the engine output speed reaches the target engine speed;
      shift the transmission into the engine braking state; and
      periodically adjust the target engine speed by a calibrated amount until the target slip is achieved at the target engine speed.

2. The vehicle of claim 1, wherein the controller adjust the target engine speed upward when the calculated level of slip exceeds the target slip at the moment the engine speed reaches the target engine speed, and downward when the target slip is reached prior to the engine speed reaching the target engine speed.

3. The vehicle of claim 1, wherein the transmission includes a first and a second gear set, and wherein the binary clutch assembly is connected between nodes of the first and second gear sets.

4. The vehicle of claim 1, wherein the transmission includes a braking clutch that is selectively engaged to connect a node of one of the gear sets to a stationary member of the transmission when shifting the transmission into the engine braking state.

5. The vehicle of claim 1, wherein the binary clutch assembly includes one of a selectable one-way clutch, a freewheeling element, and a dog clutch.

6. The vehicle of claim 1, further comprising a PRNDL valve, wherein the engine braking state is a $1^{st}$ gear low state, and the controller is configured to detect the requested shift in part by receiving a signal from the PRNDL valve.

7. The vehicle of claim 1, wherein the controller is configured to adjust the target engine speed upward by no more than 2 RPM when the calculated level of slip exceeds the target slip at the moment the engine speed reaches the target engine speed.

8. The vehicle of claim 1, wherein the controller is configured to adjust the target engine speed downward by no more than 2 RPM when the target slip is reached prior to the engine speed reaching the target engine speed.

9. A method comprising:
   recording a target slip in memory of a controller;
   detecting in a vehicle, via the controller, a requested shift of a transmission to an engine braking state while the vehicle is coasting, wherein the transmission includes a plurality of gear sets each having a plurality of nodes, an input member that is continuously connected to the engine and to one of the gear sets, and a binary clutch assembly that is connected to the same gear set as the input member;
   ramping engine speed toward a calibrated target engine speed, via the controller, in response to the detected requested shift;
   calculating a level of slip across the binary clutch assembly while ramping the engine speed;
   commanding an application of the binary clutch assembly via the controller when the engine speed reaches the target engine speed;
   shifting the transmission into the engine braking state; and
   adjusting the target engine speed by a calibrated amount when either the calculated level of slip exceeds the target slip at the moment the engine speed reaches the target engine speed or the target slip is reached prior to the engine speed reaching the target engine speed.

10. The method of claim 9, wherein applying the binary clutch assembly includes applying one of a selectable one-way clutch, a freewheeling element, and a dog clutch.

11. The method of claim 9, wherein the detecting the requested shift to an engine braking state engine includes detecting a shift to a $1^{st}$ gear low state from a higher forward gear state.

12. The method of claim 11, wherein detecting the shift into the $1^{st}$ gear low state includes processing, via the controller, a signal from a PRNDL valve.

13. The method of claim 11, wherein the transmission includes an output speed sensor in communication with the controller, the method further comprising:
   processing a speed signal from the output speed sensor to determine when the vehicle is coasting.

14. The method of claim 9, including adjusting the target engine speed upward by less than 2 RPM when the calculated level of slip exceeds the target slip at the moment the engine speed reaches the target engine speed.

15. The method of claim 9, including adjusting the target engine speed upward by less than 2 RPM when the target slip is reached prior to the engine speed reaching the target engine speed.

16. A transmission for a vehicle having an engine, the transmission comprising:
first, second, and third gear sets each having multiple nodes;
an input member that is selectively connected to the first gear set and continuously connected to the second gear set, wherein the input member receives input torque from the engine;
a binary clutch assembly that is connected to the first and second gear sets; and
a controller in communication with the engine and with the binary clutch assembly;
wherein the controller includes a processor and tangible, non-transitory memory on which is recorded instructions for increasing an output speed of the engine to a target engine speed prior to executing a requested shift of the transmission from a forward drive gear into an engine braking state while the vehicle is coasting, and wherein the controller is configured to execute the instructions from the memory to thereby:
detect the requested shift of the transmission;
command, via the processor, an increase in engine speed toward a target engine speed in response to the detected requested shift;
calculate a level of slip across the binary clutch assembly while increasing the engine speed toward the target engine speed;
command an application of the binary clutch assembly when the engine speed reaches the target engine speed;
shift the transmission into the engine braking state; and
periodically adjust the target engine speed by a calibrated amount until the target slip is achieved at the target engine speed.

17. The transmission of claim 16, wherein the controller periodically adjusts the target engine speed upward by a calibrated amount of no more than 5 RPM when the calculated level of slip exceeds the target slip at the moment the engine speed reaches the target engine speed, and by a calibrated amount of no more than 5 RPM when the target slip is reached prior to the engine speed reaching the target engine speed.

18. The transmission of claim 16, further comprising a stationary member and a first braking clutch, wherein the first braking clutch is selectively engaged to connect a node of the third gear set to the stationary member when shifting the transmission into the engine braking state.

19. The transmission of claim 18, further comprising a second braking clutch, wherein the first, second, and third gear sets each have a first, a second, and a third node, and wherein the third node of the first gear set and the first node of the third gear set are selectively connected to the stationary member via actuation of the respective second and first braking clutches.

20. The transmission of claim 16, wherein the transmission includes an output speed sensor in communication with the controller, and wherein the controller is operable to determine when the vehicle is coasting by processing a speed signal from the output speed sensor.

* * * * *